Dec. 15, 1959  G. H. RODGERS  2,917,731
MULTIPLE INDICATOR SYSTEM WITH RESETTABLE WARNING SIGNAL
Filed May 23, 1958  4 Sheets-Sheet 1
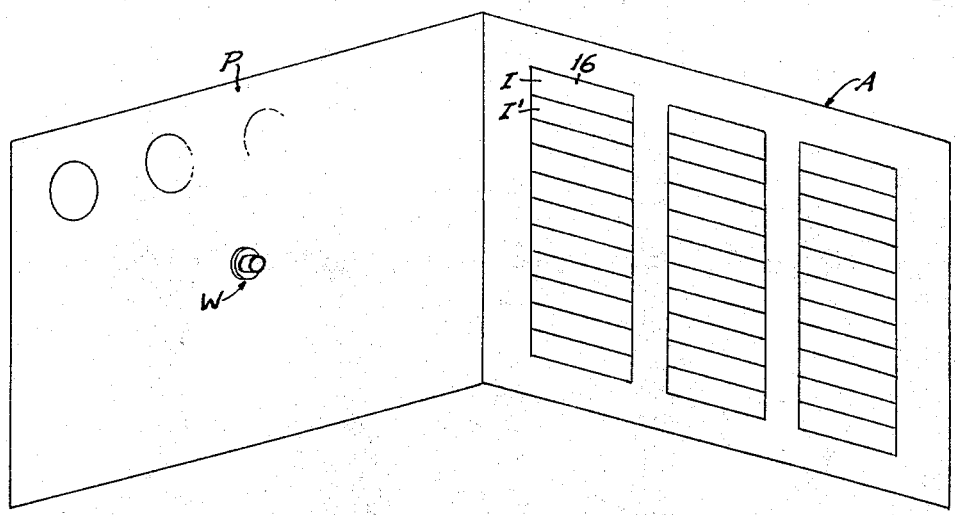
Fig.2
Fig.1
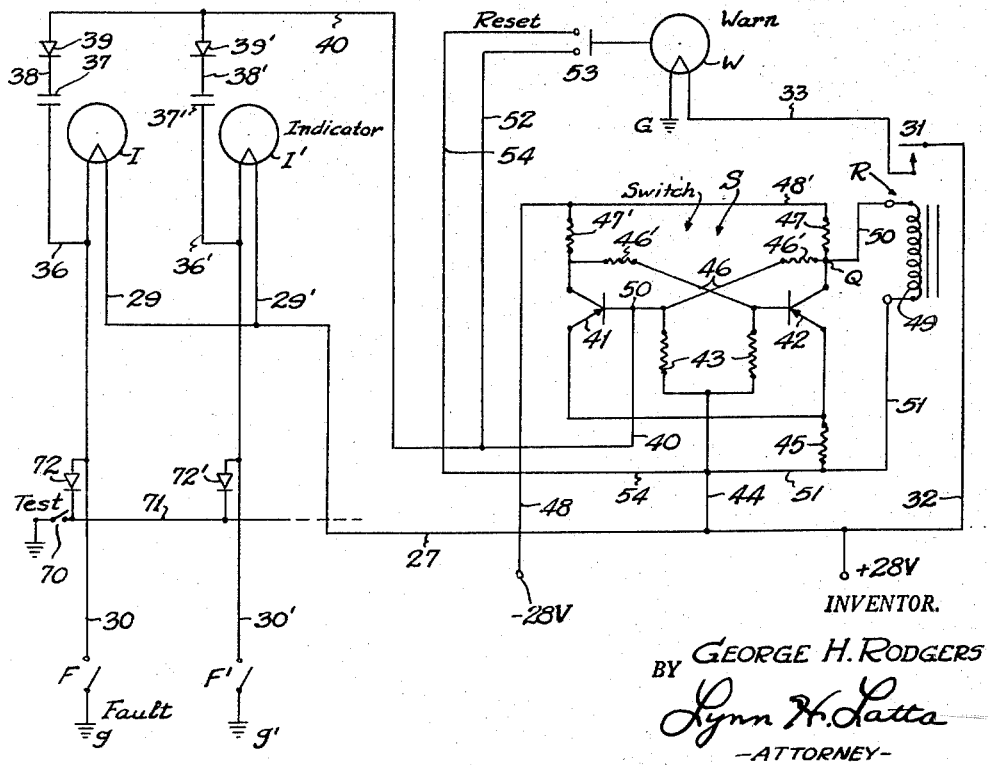
INVENTOR.
BY GEORGE H. RODGERS
Lynn H. Latta
—ATTORNEY—

Dec. 15, 1959     G. H. RODGERS     2,917,731
MULTIPLE INDICATOR SYSTEM WITH RESETTABLE WARNING SIGNAL
Filed May 23, 1958     4 Sheets-Sheet 2

INVENTOR.
GEORGE H. RODGERS
BY Lynn H. Latta
-ATTORNEY-

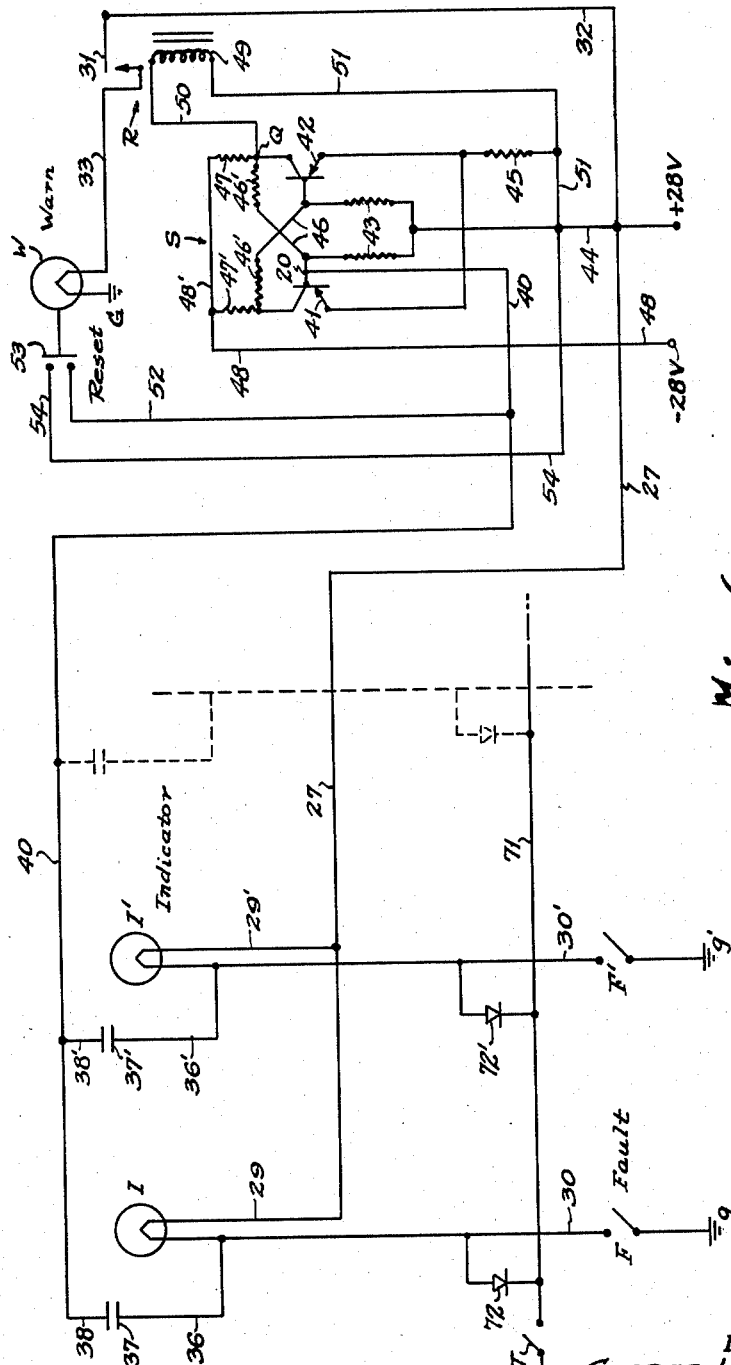

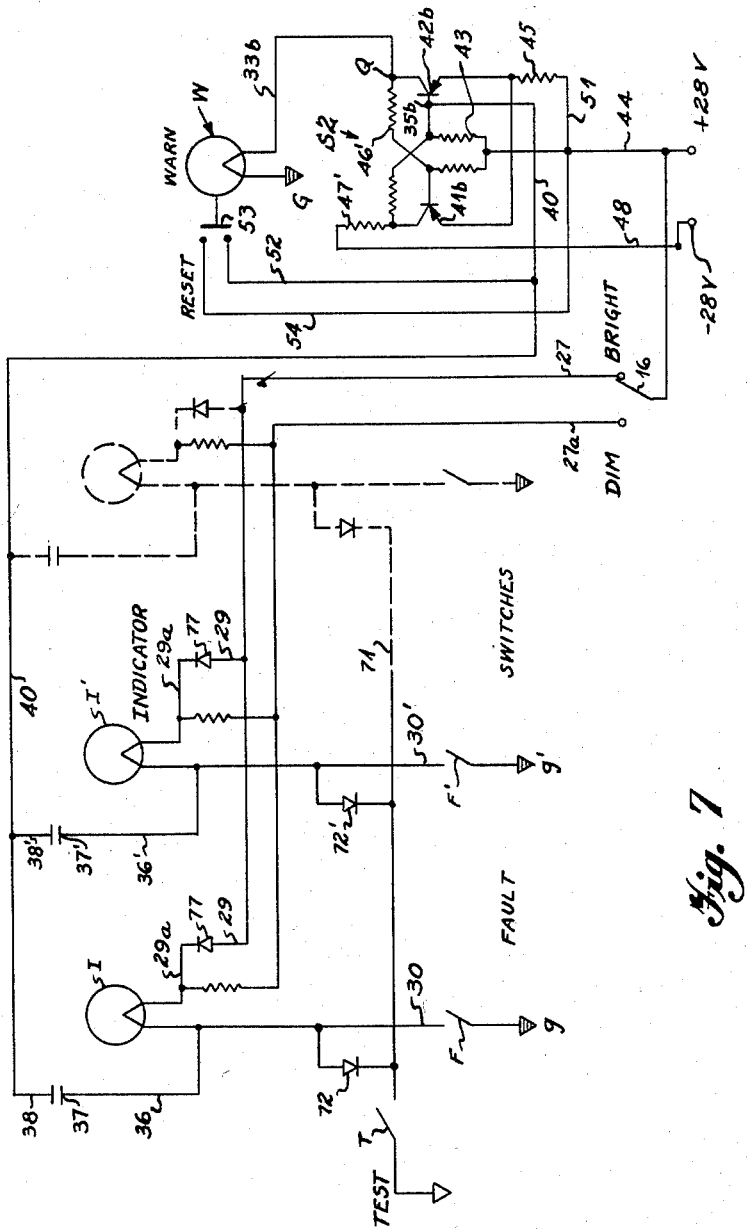

United States Patent Office 2,917,731
Patented Dec. 15, 1959

2,917,731

MULTIPLE INDICATOR SYSTEM WITH RESETTABLE WARNING SIGNAL

George H. Rodgers, Elsinore, Calif.

Application May 23, 1958, Serial No. 737,388

14 Claims. (Cl. 340—213)

This application is in part a continuation of my pending applications S.N. 621,818, filed November 13, 1956 and 627,674, filed December 11, 1956.

This invention relates to a warning system of the multiple indicator or annunciator type adapted to indicate separately the conditions existing in any number of units of mechanism. For example, the invention is applicable to an aircraft having various mechanisms such as landing gear retractors, flap actuators and other mechanisms, e.g. Pitot heaters, etc., and is useful in indicating conditions of operation and position of such actuators as well as conditions existing in such other mechanisms including, for example, engines, fuel tanks, etc. The invention is especially applicable to a warning or annunciator system for a complex machine requiring a large number of indicators, and has as a general object to provide an electrical indicator system which will separably indicate various conditions existing in any number of operative mechanisms, and which, in addition, includes an alarm device adapted to call the attention of an operator to each abnormal condition as it occurs, so that the operator will not be required to keep the condition indicators under constant observation, and may limit his observation of the indicators to the instances where the warning device gives its signal.

In order for the warning device to be most effective, the invention provides for a single warning device which can be immediately reset to an inoperative condition each time it gives its signal. However, it is important that the individual condition indicators remain in active signalling operation so long as the respective conditions indicated by them remain abnormal. Consequently, a basic object of this invention is to provide a combined indicator and warning signal system wherein the warning signal can be reset to an inoperative state without affecting the condition indicators, and wherein the latter will hold their indicating state so long as the respective conditions remain abnormal.

A further object is to provide such a multiple indicator system wherein the indicating, the alarm and the resetting operations are actuated through a switching circuit utilizing transistors. Specifically, the invention contemplates the use of a bi-stable, flip-flop circuit utilizing a pair of P.N.P. junction type transistors for alternately energizing th indicator and alarm operating circuit on the one hand and the resetting circuit on the other hand.

A further object is to provide such a multiple indicator system wherein means for testing the respective indicators to ascertain whether they are in proper operating condition, is provided. A still further object is to provide in such a system, a means for mass testing all of the indictaors through a single test switch.

In some installations there is a requirement for a system which, in addition to all of the above outlined characteristics, will automatically effect the return of the warning device to its inoperative state upon termination of the abnormal condition which initially caused both the warning device and the condition indicator to be activated to indicating state.

In one of its aspects, the invention contemplates an improvement providing for such automatic extinguishment of the warning signal simultaneously with the removal of the abnormal condition indication on the bank of indicators.

A further object is to provide such a system wherein the warning signal will be extinguished in response to any testing operation, whether by actuation of a master test switch or an individual test switch for an individual indicator.

Another object is to provide such a multiple indicator system, wherein resetting may be effected by pushing the warning lamp inwardly in its socket.

A still further object is to provide such a multiple indicator system wherein, if desired, the individual indicators may be of a type that can be individually tested by pressing inwardly on the respective indicators, although this is not an essential feature of the invention.

Other objects and advantages will become apparent in the ensuing specification and drawings in which:

Fig. 1 is a schematic view of a multiple indicator system embodying the invention;

Fig. 2 is a perspective view of an annunciator panel;

Fig. 6 is a schematic diagram of an improved form of the invention; and

Fig. 7 is a schematic diagram of a further improved form of the invention.

Figure 3:
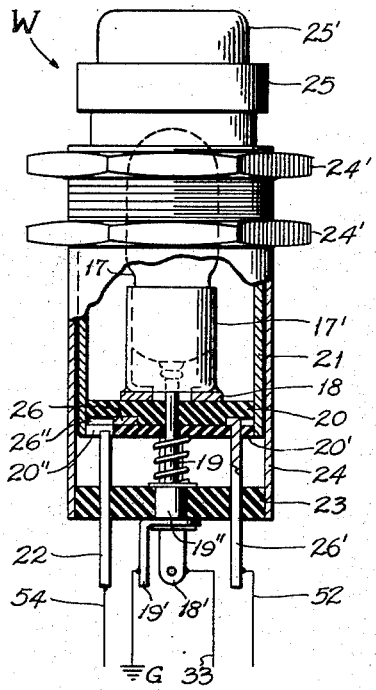
Fig. 3 is a detail side-elevational-sectional view of a combined push-button switch and warning light shown as an example of a construction that can be utilized for the warning-reset unit.
Figure 4:
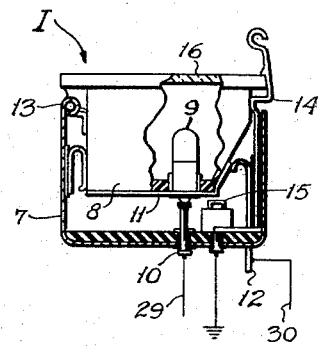
Fig. 4 is a detail side-elevational-sectional view of a self-testing indicator light, shown as an example of one type of indicator light that can be utilized.

Referring now to the drawings in detail, I have shown, in Fig. 1, as an example of one form in which the invention may be embodied, a multiple indicator and warning system including a series of indicators I, I', etc., each adapted to indicate the conditions existing in a corresponding unit of mechanism having a "fault" switch F, F', etc., which may normally stand open and be actuated to a closed position upon the occurrence of a failure or abnormal condition in the respective unit of mechanism.

Where there are a large number of indicator circuits, the indicators I, I', etc., are preferably arranged in an annunciator panel A (Fig. 2) removed from the direct vision of the operator (e.g. arranged along one side of a pilot's compartment in an aeroplane) and the initial indication of a change in condition in any of the units of mechanism to be kept under observation, is given by a warning indicator W located directly in front of the operator and preferably of a character to immediately arrest the attention of the operator when actuated. For example, the warning indicator W may be a red light indicator of ample brilliance to arrest the attention, while the indicators I, I', etc., may be fairly small indicator lights arranged in banks on an annunciator panel. Indicator W may be mounted in the pilot's front instrument panel P. The system also includes a relay R and a reversing switch S utilizing transistors for switching relay R to two alternate positions (open and closed) and which is bi-stable or adapted to hold in either position when shifted thereto. Switch S is further characterized in that it is responsive to transient electrical pulses received through a control circuit.

The diagram shows two of the indicators I, I' although it will be understood that any number of such indicators may be included in the system, in a parallel arrangement such as that disclosed, and the broken lines are intended to suggest the extension of the system to include additional indicators not individually disclosed in the drawing.

Indicators I, I', etc., are energized through a conductor 27 leading from a common source of current, (e.g. the positive side of a 28 volt direct current source indicated at 28V) and connected to the filaments of the respective indicator lamps through branch conductors 29, 29' etc. Individual circuits to the respective indicators I, I', etc., are completed through ground conductors 30, 30', etc., upon closing of respective fault switches F, F', etc.

Warning indicator W is energized through relay R having an armature contact 31 which is connected by a conductor 32 to the voltage source 28V. A conductor 33 connects the other contact of relay R to the filament of warning light W, the other side of the filament being connected to ground at G. It will now be apparent that when relay R is closed, warning lamp W will be energized by a circuit which is completed through the relay R from the 28 volt source 28V through conductors 32 and 33; whereas an indicator I, I', etc., will be illuminated whenever a circuit is completed, by closing switch F, F'.

Relay R is closed each time one of the fault switches is closed, but may be manually reopened by a resetting operation while the fault circuit remains closed. To this end, the invention provides a series of trigger circuits including respective conductors 36, 36', etc., connected to respective ground conductors 30, 30', etc., in parallel with respective indicator lamps I, I', etc.; pulse-storing condensers 37, 37', etc., each having one side connected to a respective conductor 36 or 36', etc.; conductors 38, 38', etc., each leading to one side of a respective diode, 39 or 39', etc.; and a common interconnecting conductor 40 extending from the diodes, in parallel, to a flip-flop reversing switch S. The diodes 39, 39', etc., permit one way flow from condensers 37, 37', etc., to a control point in switch S but block any reverse flow. The diodes may be germanium diodes.

Each condenser is adapted to collect a charge, e.g. a positive charge collected through the filament of a respective indicator lamp and through its respective connection 29 or 29', etc., and 27 to the positive side of the 28 volt source 28V. The opposite side of the condenser being isolated by the respective diodes, the charge will be collected until the closing of a respective fault switch discharges the condenser to ground, thereby communicating a pulse to the control point of switch S.

The reversing switch S may embody a conventional flip-flop circuit wherein a pair of P.N.P. transistors 41 and 42 are arranged with their base electrodes connected through resistors 43 and a conductor 44 to the current source 28V, and with their respective emitters connected through a common resistor 45 to conductor 44 and thence to source 28V, for bias voltage. Through criss-cross circuits 46 including resistors 46', the base electrode of one transistor is connected to the collector of the other transistor and vice versa, and through resistors 47, 47' and conductors 48, 48', the respective collectors are connected to the negative side of the source 28V indicated at —28V (or to ground). Resistors 43, 46', 47 and 47' are of realtively high resistance value (e.g. 5000 ohms) whereas bias resistor 45 is of relatively low resistance value (e.g. 270 ohms). Conductors 48, 48' provide a direct connection from the negative point —28V through resistor 47, in series, to a junction point Q.

Relay R has an energizing coil 49 one side of which is connected through a conductor 50 directly to the collector of transistor 42 and junction point Q, and the other side of which is connected to the source 28V through a conductor 51.

Current for energizing relay 49 flows in a circuit from negative point —28V through conductors 48, 48', 50, coil 49 and conductors 51, 44 to source 28V. From point Q, a parallel alternative circuit to source 28V extends through transistor 42, resistor 45 and conductors 51, 44. When transistor 42 is in a conductive state, a major or substantial portion of current flow will pass through this alternative circuit, droping the voltage across relay coil 49 to an extent such that current flow through coil 49 will be reduced below the value required for closing the relay, and consequently, the relay will remain open. The ratio between resistances in coil 49 and resistor 45 is set at the proper value to bring this about. When the transistor 42 becomes non-conducting, the alternative path of current flow is, in effect, cut off, the voltage across coil 49 is increased to a maximum, and current flow in coil 49 will be increased to a sufficiently high value to cause the relay to close.

Transistor 42 becomes non-conducting when a negative pulse, applied to the base of transistor 41, changes the latter from low conductivity to high conductivity, and vice versa, this "flip-flop" action being achieved through the cross linkage 46 in a known manner. The term "negative pulse" referred to above, designates the type of electrical impulse that will occur when the positively charged side of a condenser 37 or 37' etc., is shunted to ground through the closing of a corresponding fault switch F or F' etc., causing a momentary flow of current in which the negative charge on the condenser (the side connected to trigger conductor 40) is dissipated. With the condenser charge thus dissipated, the bias voltage of transistor 42 is applied to the emitter of transistor 41 through resistor 45, and transistor 41 will conduct with high collector current and is stable in the saturation region of the negative-resistance characteristics. At the same time, the transistor 42 will be stable at the same voltage point in the cut off region of the characteristic and will conduct with considerably less collector current. Therefore, transistor 41 may be said to be "on" and transistor 42 may be said to be "off." In this condition, relay coil 49 will carry sufficient current to close the relay and the warning lamp W will be illuminated. The change over to this condition, as indicated above, is triggered by the transient negative pulse which is transmitted to the control point 35 of switch S when the negative charge on the near side of condenser 37 or 37' etc., is dissipated upon closing of a respective fault switch F, or F', etc.

A pulse of opposite polarity, applied to the base of transistor 41, will restore the latter to low conductivity and switch the transistor 42 "on," thus reducing the current flow in coil 49, opening relay R, and extinguishing lamp W. To provide a pulse of opposite polarity, a connection to the base electrode of transistor 41 is established through a conductor 52, a reset switch 53, and a conductor 54 which is connected to conductor 44 and thus to the current source 28V on its positive side. Such connection will provide a pulse of opposite polarity to that received from a condenser 37 etc., through the connection 40 to the negative side thereof.

Reset switch 53 is built into the warning lamp W so as to be closed when the head of the lamp is pushed inwardly.

For testing the indicator lights I, I' etc., I provide a master test switch 70, one side of which is connected to ground and the other side to a common test conductor 71. Conductor 71 is connected through a series of diodes 72, 72', etc., to the respective ground conductors 30, 30', etc., the diodes 72 etc., providing for one way current flow between all of the indicator lamps I, etc., and ground, but blocking current flow in the opposite direction. This arrangement serves to isolate the control action of each of the fault switches F, F' etc., so that the closing of one of these switches will effect only its respective indicator lamp. For example, the closing of fault switch F could not establish a ground connection to the common ground conductor 71 for the reason that the diode 72 is interposed between conductor 30 and conductor 71 so as to block current flow between conductor 71 and its fault switch. Its arrangement with respect to switch F is reversed with reference to its arrangement to switch 70, for which it is conductive. Since the common ground conductor 71 is isolated from the fault switches F, etc., it is impossible for a common ground connection to be established to all of the indicator lights through any of the fault switches.

The indicator lights I, I' shown in Fig. 1 may be of a simple two-terminal type, connected as shown.

The indicator lamps I, I', etc., may optionally be of a type embodying an individual test switch operable by pushing a light-bulb carrying casing inwardly to break a connection between the indicator light filament and the fault circuit 30, etc., and to then make a direct connection to a ground connection so as to test the individual indicator lamp. Such a lamp is shown in Fig. 3, as a modified form. The remainder of the circuit may be the same as that disclosed in Fig. 1. By way of example of an annunciator apparatus including a series of indicators bearing appropriate data, the indicator shown in Fig. 3 may be one unit of a series embodied in an annunciator having a shell 7 of channel form, said unit comprising a rectangular lamp casing 8 of insulating material having one or more indicator light bulbs 9 having their center contacts in engagement with spring-pressed terminal pins 10 and their side contacts connected to a bus bar 11 one end of which constitutes a contact that is normally engaged with a contact on a terminal 12. The casing 8 is hinged at 13 to the shell 7 and is normally spring-urged by pins 10 against a detent on a spring latch 14, establishing the normal circuit to a fault switch F through contacts 11, 12. For individual testing, casing 8 may be pressed inwardly to bring bus bar 11 against a contact on the inner end of a terminal 15, which may be connected directly to ground as indicated, in parallel with the fault switch so as to shunt the same when energized.

A narrow legend-bearing translucent window 16 closes the front of casing 8.

The warning lamp W may be constructed either as shown in the application of Harrington and Jentges, S.N. 549,146, filed November 25, 1955, allowed December 9, 1957, or as shown in their Patent No. 2,816,995, granted December 17, 1957, for Illuminated Push-Button Switch, wherein an electric light bulb is mounted in a barrel which in turn is slidably mounted in a casing for attachment to a mounting panel, the barrel carrying a contact that is isolated from the connections to the light bulb and is adapted to engage a fixed contact carried by the casing when the barrel is pushed inwardly by pressure against a lens cap on its outer end.

As an example of the construction that may be utilized in the warning-reset unit W, I have shown in Fig. 3 a combined push button switch and indicator lamp wherein a light bulb 17 has its base mounted in socket 17' which is secured to a head 18, in ring form, of a terminal 18', while the center contact of bulb 17 engages a connector pin 19 which is connected to a terminal 19', the terminal head 18 being mounted upon an insulator washer 20 fixed in the end of a slidable barrel 21, and the pin 19 being extended through the washer 20 and slidable in a connector sleeve 19" mounted in an insulator washer 23 that is secured in the end of a casing 24 within which the barrel 21 is slidably mounted. Barrel 21 has a lens cap 25 embodying a suitable ruby lens or the like 25' for giving a warning indication. Casing 24 may be secured in a panel by means of mounting nuts 24'.

The reset switch in such a unit may comprise a head 26 in ring form on the end of a terminal 26', having a radially projecting contact 26" engageable with the inner end of a terminal 22, fixed in the washer 23. Head 26 may be secured between washer 20 and another insulator washer 20', and terminal 26' may extend freely through an aperture in washer 23 for sliding movement therein. Washer 20' has a notch 20" to receive the inner end of terminal 22.

It will be apparent that separate circuits to the light bulb 17 (through terminals 18' and 19') and to the contacts of the reset switch (through terminals 26' and 22) are established, whereby the light 17 may be illuminated through the warning lamp control circuit and the reset switch may separately control a reset operation.

At this point, it may be noted that when an individual indicator lamp I, I' etc., is illuminated, it will remain energized until the removal of the abnormal condition causes the respective fault switch to reopen. The warning lamp W on the other hand will be extinguished whenever the relay R is opened.

Figure 5:
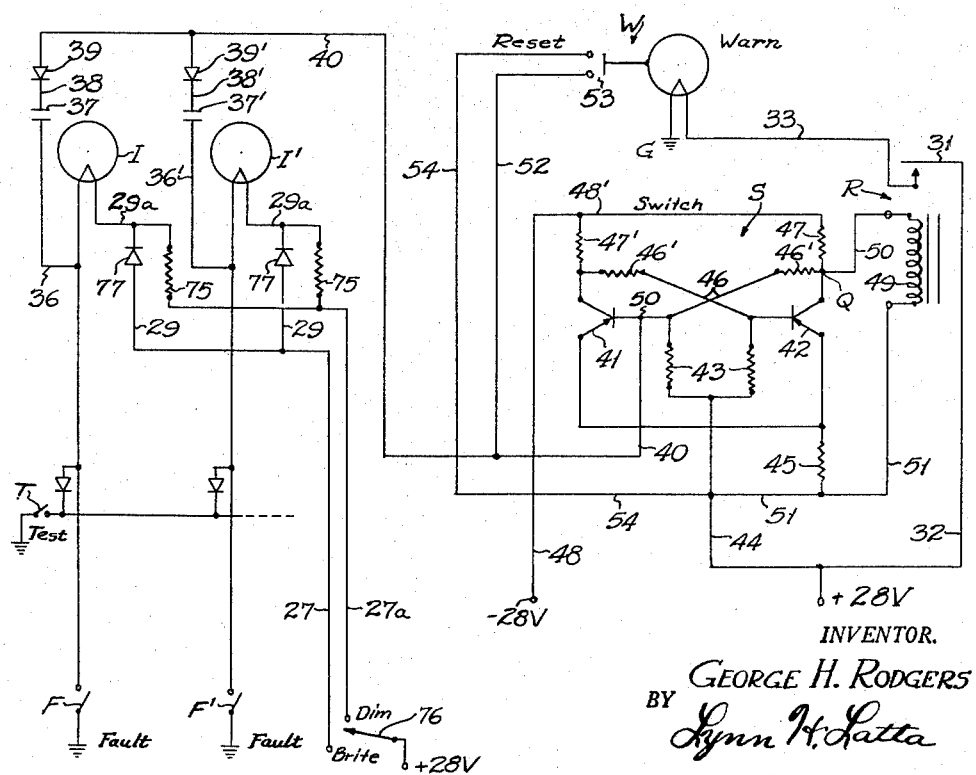
Fig. 5 is a schematic diagram of a modified form of the invention.

*Modified form—Fig. 5*

In the form of the invention shown in Fig. 5, instead of a single power lead from the current source to the series of indicators I etc., the invention provides alternative power leads including the conductor 27 and a second common conductor 27a which is connected to the respective indicators by branch conductors 29a each embodying in series a resistor 75 for reducing the voltage sufficiently to effect a dim actuation of the respective indicators instead of the bright actuation which is effected through conductors 27 and 29 and series diodes 77. Diodes 77 function to isolate the bright circuit from the dim circuit to avoid feed back of current through resistors 75 and connections 29 of other indicators to the filament connection 29a of the lamp circuit that has been closed at its fault switch. Such a feed back through several resistors 75 in parallel would increase the current above the low value required for "dim" illumination and would be undesirable for that reason. For switching between the bright and dim circuit, there is provided a double throw switch 76 the movable contact of which is connected to the source 28V and is adapted to alternatively engage contacts at the ends of the conductors 27 and 27a respectively, as shown. In other respects, this circuit may be the same as the one disclosed in Fig. 1.

*Improved circuit—Fig. 6*

The invention, in the forms described above, meets the requirements for a multiple indicator system including individual indicators, actuated by respective fault switches upon occurrence of an abnormal condition and reset to non-indicative condition when the abnormal fault condition disappears; a master warning device, actuated through a flip-flop transistor switch for calling attention to each new actuation of an individual indicator and adapted to be manually reset to a non-indicating condition without affecting the individual indicators, and a master test switch for testing the individual indicators. Such a system is highly satisfactory in all applications where it is desired to have the warning device hold its warning indication until manually reset. However, in some installations there is a requirement for a system which, in addition to all of the above outlined characteristics, will automatically effect the return of the warning device to its inoperative state upon termination of the abnormal condition which initially caused both the warning device and the condition indicator to be activated to indicating state.

In this respect, the system as disclosed in Fig. 6 constitutes an improvement upon the systems disclosed in Figs. 1–5, in that it provides for such automatic extinguishment of the warning signal simultaneously with the removal of the abnormal condition indication on the bank of indicators.

In this improved arrangement, a positive charge, transmitted through the filament of a respective indicator lamp from the positive side of source 28V, will collect on that side of the condenser which is connected to the respective conductor 36, or 36' etc., and a negative charge, induced on the opposite side of the condenser, becomes the negative pulse which triggers reversing switch S to remove the shunt from relay R, closing the relay to light lamp W. Diodes 39, 39' etc. of Figs. 1 and 5 are omitted, and instead, the conductors 38, 38' etc. provide two-way flow connections between capacitors 37, 37' etc. and the trigger conductor 40. In other respects, the circuit shown in Fig. 6 is the same as that shown in Fig. 1, and the characteristics of operation described above are inherent in the circuit of Fig. 6 with the exception that there is no provision for blocking reverse flow between condensers 37, 37' etc. and the control point 35; and accordingly, relay R will be closed each time one of the fault switches is closed, but may be manually reopened by a resetting operation while the fault circuit remains closed; and will be automatically reopened when the fault switch (any fault switch) is reopened.

This effect is attained by application of a positive pulse (i.e. a pulse of polarity opposite to that which originally triggers the lighting of warning lamp W) to the base of transistor 41, restoring the latter to low conductivity and switching the transistor 42 to the "on" state, thus reducing the current flow in coil 49, opening relay R, and extinguishing lamp W. Such a positive pulse will be applied at control point 35 when a fault switch that has been closed shifts back to its open position. The opening of the fault switch, again reversing the polarity of the condenser so that the side thereof connected to trigger conductor 40 reverses back to negative state, will apply a positive pulse to the control point 20 of switch S. A positive pulse can be applied also through a conductor 52 from a reset switch 53 one side of which is connected through conductor 52 to the trigger circuit 40 and the other side of which is connected through a conductor 54 to the positive side of source 28V.

It will now be apparent that upon any occurrence of an abnormal condition resulting in the closing of a fault switch and the actuation of a corresponding indicator, the warning lamp will simultaneously be actuated. Thereupon, while the indicator remains activated, the operator may immediately extinguish the warning lamp by pressing on the head thereof. On the other hand, if an abnormal condition occurs momentarily and quickly disappears, before the operator has occasion to reset the warning lamp, the warning lamp will automatically be extinguished, thus eliminating the necessity for manual resetting and also calling the operator's attention to the fleeting nature of the abnormal condition.

The closing of test switch T, like the closing of a fault switch F etc., will ground that side of each condenser which is connected to the control connection 30 or 30', etc., thus causing a negative pulse to be transmitted to control point 20 of switch S. A warning light W will accordingly be illuminated whenever a testing operation is performed. Conversely, the opening of test switch T, by removing ground from those condensers, not grounded through a fault switch, will cause a positive pulse to be transmitted to control point 20, thereby again reversing switch S and extinguishing warning lamp W.

The indicator lights I, I' of Fig. 6 may be of a simple two-terminal type, connected as shown. Alternatively, the indicator lamps may be of a type embodying an individual test switch operative by pushing a light bulb carrying casing inwardly, to break a connection between the indicator light filament and the fault circuit 30 etc. and to then make a direct connection to ground so as to test the individual indicator lamp, as disclosed in Fig. 4. Where an individual test switch is thus built into each indicator light, the operation thereof will have the same effect on the switch S and warning lamp W as described above for the operation of master test switch T, i.e., closing an individual test switch will send a negative pulse to illuminate warning lamp and the opening of that switch will send a positive pulse to extinguish the lamp W.

The individual indicator lamps are preferably of an annunciator type in which the lamps have elongated legend bearing faces adapted to be illuminated when the lamps are lighted, thus apprising the operator of the particular condition that has been affected.

Instead of the single power lead arrangement shown in Fig. 6, the invention may utilize a "bright" and "dim" arrangement wherein alternative circuits are provided between current source 28V and the indicator energizing collector 29, 29' etc., as shown in Fig. 5.

*Preferred form of the invention (Fig. 7)*

In the preferred form of the invention disclosed in Fig. 7, a further improvement is incorporated, in that the relay R is eliminated, and the circuit is thereby simplified, with the simplified system attaining the same improved results as in the case of the circuit of Fig. 6. The system of Fig. 7, the apparatus is the same as that disclosed in Fig. 6, as modified by the addition of the "bright" and "dim" alternate circuits of Fig. 5; with the exception of (a) the elimination of relay R, and (b) the modification of the transistor switch so as to provide in switch S2 a normally non-conducting condition for transistor 42b (as contrasted to the normally conducting condition of transistor 42 of Fig. 6), and the utilization of a negative pulse, transmitted through control conductor 40, for triggering the switching of transistor 42b to a conducting condition, with transistor 41b simultaneously changing from conducting to non-conducting state. This is accomplished by locating the control point 35b as a connection to the base of transistor 42b instead of the connection to the base of transistor 41 shown in Figs. 1, 5, and 6.

When transistor 42b is thus switched to the conducting state, its collector current is fed directly to the warning lamp W, to energize the same. This energizing current is carried by a conductor 33b connecting the junction point Q directly to one side of warning light W, the other side being connected to ground at G.

The resistance of lamp W replaces the resistance of resistor 47 in the other circuits shown in Figs. 1, 5 and 6. Consequently, the connection 33b through lamp W also replaces the connection 48' from resistor 47 of the other circuits, to ground, and accordingly, conductor 48' of the other circuits is eliminated, further simplifying the circuit.

*Review of operation*

Reviewing the operation of the system as a whole (in its generic aspects applicable to all of the various modifications shown herein), and using the terminology of the appended claim: a plurality of electrical indicators I, I', etc., are arranged to be actuated by corresponding indicator circuits including a common power lead 27 connecting them in parallel to the current source 28V, the respective indicator actuator circuits including fault switches F, F' etc., and control connections 30, 30' etc., leading form the respective fault switches to respective indicators for energizing the same to provide individual indicator functions (e.g. failure of flap mechanism, failure of landing gear mechanism, etc.). Electrical warning device W is arranged to be actuated each time one of the individual indicators I, I' etc., is actuated, so as to call attention to such individual indicator function, the actuation of the warning device W being effected through a flip-flop transistor switch S having a control point 35 at the base electrode of its transistor 41. Such actuation is triggered by a pulse of one polarity transmitted through a common pulse transmitting conductor 40 to such control point of switch S, from a condenser 37 etc., in a respective one of a plurality of trigger circuits each including a condenser 37, 37' etc., having a connection 36 or 36', etc., to a respective indicator lamp I or I' etc., and a connection 38 or 38' etc., to the common conductor 40, for transmission of a pulse to the control point of the transistor switch S when a respective fault switch is closed. Conductor 40 provides a connection to the respective condenser for built-up of charge thereon when the respective fault switch is open. The system further includes a reset circuit including the reset switch 53 arranged for connecting (through conductor 52) the control poin 35 of switch S to an element of the system (positive side of current source 28V) when the reset switch is closed as by pressing the warning device W toward its mounting panel.

In addition to the foregoing, the system includes a test circuit including the master test switch 70 and a connection in parallel to the respective indicator lamps I etc., through the common test conductor 71, respective isolation diodes 72 etc., and respective fault switch control connections 30 etc., whereby the test switch, in parallel with the fault switches F etc., is adapted when closed to close all of the energizing circuits of the indicators I etc., as by connecting them to ground across the fault switches etc., the isolating diodes 72 functioning to keep the respective fault switches F etc., in individual controlling relation to their respective indicators and isolating each of them from all the remaining indicators.

The invention provides a relatively simple, lightweight apparatus combining a plurality of individual indicators of any required number with a warning device which is actuated coincidentally with the actuation of any one of the individual indicators to call attention to such actuation, and which may be reset to an inactive condition promptly when the operator has observed the actuated indicator, without erasing the indication that has been set up on the latter, leaving the individual indicator to remain in indicating condition until correction has been made of the fault that it indicates. Thus a single warning device is operable to announce the new actuation of any number of individual indicators, being resettable as often as necessary while leaving any number of such indicators in indicating condition.

As previously indicated, a warning lamp W will be extinguished upon the opening of any fault switch that has been closed, regardless of whether other fault switches are closed at the time. Furthermore, the warning light will be energized whenever a fault switch is closed regardless of whether other fault switches are closed at the time. The same is true with respect to the actuation of a test switch, which will set up a pulse of one polarity or the other upon either opening or closing the same, regardless of the position in which other switches of the circuit may stand.

In explanation of this advantageous characteristic of the system, it may be noted that the several condensers 37, 37' etc., arranged in parallel as shown, provide a total capacitance for the system, which is a function of the sum of the individual capacitances, and the actuation of a fault switch or test switch for any one section of this capacitance will vary the value of the total capacitance in a manner to set up a momentary electrical pulse, regardless of the conditions existing with respect to the other sections of the total capacitance.

I claim:

1. In a multiple indicator system: an electrical warning device; a circuit including a relay for actuating said device; a plurality of electrical indicators having individual indicator functions; a plurality of corresponding indicator actuator circuits including a common power lead for connecting the respective indicators in parallel to a source of current, and each including a fault switch and a control connection therefrom to a respective indicator; a circuit for energizing said relay; means to control said energizing circuit, including a pulse responsive flip-flop transistor switch operable in reverse directions in response to pulses of opposite polarity applied to a control point thereof; a plurality of trigger circuits including a pulse-transmitting conductor providing a common connection in parallel to said control point, including respective charge collecting condensers each connected on one side to a respective fault switch control connection for effecting discharge thereof upon closing of the respective fault switch so as to transmit through said pulse transmitting conductor to said transistor switch a pulse of the proper polarity to render said transistor switch effective to energize said relay, and each trigger circuit including a diode arranged as a one-way connection between its respective condenser and said pulse transmitting conductor for conduction in the direction to transmit a pulse from the respective condenser to said transistor switch and blocking reverse flow; and a reset circuit including a reset switch for connecting said transistor switch control point to a point in said system having a potential of polarity opposite to that at said fault switches, whereby to transmit to said control point a pulse of opposite polarity for rendering said transistor switch effective to energize said relay.

2. An indicator system as defined in claim 1, wherein said warning device comprises a lamp having a movable part, said reset switch being embodied in said lamp and associated with said movable part so as to be manually actuable by pressure applied to said movable part.

3. A system as defined in claim 1 including an alternate power lead and resistors connecting the same to the respective indicator lamps for providing dimming circuits thereto, and a double throw switch operable for selectively connecting either said first mentioned power lead or said alternate power lead to the power source; and means connecting said common power lead to the respective indicators, said last means including diodes for blocking reverse flow therein.

4. In a multiple indicator system: an electrical warning device; a circuit including a relay for actuating said device; a plurality of electrical indicators having individual indicator functions; a plurality of corresponding indicator actuator circuits including a common power lead for connecting the respective indicators in parallel to a source of current, and each including a fault switch and a control connection therefrom to a respective indicator; a circuit for energizing said relay; means for controlling said energizing circuit, including a pulse responsive flip-flop transistor switch including a first transistor for direct control of said relay and a second transistor for controlling the bias on said first transistor for switching from conducting to non-conducting condition and vice-versa in response to pulses of opposite polarity applied to a base electrode of said second transistor; a plurality of trigger circuits including a pulse-transmitting conductor providing a common connection in parallel to said base electrode, including respective charge collecting condensers each connected on one side to a respective fault switch control connection for effecting discharge thereof upon closing of the respective fault switch so as to transmit through said pulse transmitting conductor to said transistor switch a pulse of the proper polarity to render said transistor switch effective to energize said relay, and each trigger circuit including a diode arranged as a one-way connection between its respective condenser and said pulse transmitting conductor for conduction in the direction to transmit a pulse from the respective condenser to said transistor switch and blocking reverse flow; and a reset circuit including a reset switch for connecting said transistor switch control point to a point in said system having a potential of polarity opposite to that at said fault switches, whereby to transmit to said control point a pulse of opposite polarity for rendering said transistor switch effective to deenergize said relay.

5. In a multiple indicator system: an electrical warning device; a circuit including a relay for actuating said device; a plurality of electrical indicators having individual indicator functions; a plurality of corresponding indicator actuator circuits including a common power lead for connecting the respective indicators in parallel to a source of current, and each including a fault switch and a control connection therefrom to a respective indicator; a circuit for energizing said relay; means to control said energizing circuit, including a pulse responsive flip-flop transistor switch operable in reverse directions in response to pulses of opposite polarity applied to a control point thereof; a plurality of trigger circuits including a pulse transmitting conductor providing a common connection in parallel to such control point, including respective charge collecting condensers, each connected on one side to a respective fault switch control connection for effecting discharge thereof upon closing of the respective fault switch so as to transmit through said pulse transmitting conductor to said transistor switch a pulse of the proper polarity to render said transistor switch effective to energize said relay; and a reset circuit including a reset switch for connecting said transistor switch control point to a point in said system having a potential polarity opposite to that at said fault switches, whereby to transmit to said control point a pulse of opposite polarity for rendering said transistor switch effective to deenergize said relay.

6. An indicator system as defined in claim 5, wherein the connections between said condensers and said control point on the one hand and between said condensers and said control circuits on the other hand are adapted for two-way flow of electrical energy, whereby to transmit pulses of opposite polarity to said control point in response to opening and closing of a fault switch respectively.

7. A system as defined in claim 6, including a master test switch, parallel connections between said test switch and the respective fault switch control connections, and diodes in said parallel connections for blocking current flow between said parallel connections and said fault switches.

8. In a multiple indicator system: an electrical warning device; a circuit including a relay for actuating said device; a plurality of electrical indicators having individual indicator functions; a plurality of corresponding indicator actuator circuits including a common power lead for connecting the respective indicators in parallel to a source of current, and each including a fault switch and a control connection therefrom to a respective indicator; a circuit for energizing said relay; means for controlling said energizing circuit, including a pulse responsive flip-flop transistor switch including a first transistor for direct control of said relay and a second transistor for controlling the bias on said first transistor for switching from conducting to non-conducting condition and vice-versa in response to pulses of opposite polarity applied to a base electrode of said second transistor; a plurality of trigger circuits including a pulse-transmitting conductor providing a common connection in parallel to said base electrode, including respective charge collecting condensers each connected on one side to a respective fault switch control connection for effecting discharge thereof upon closing of the respective fault switch so as to transmit through said pulse transmitting conductor to to said transistor switch a pulse of the proper polarity to render said transistor switch effective to energize said relay; and a reset circuit including a reset switch for connecting said transistor switch control point to a point in said system having a potential of polarity opposite to that at said fault switches, whereby to transmit to said control point a pulse of opposite polarity for rendering said transistor switch effective to deenergize said relay.

9. In a multiple indicator system: an electrical warning device; a circuit for actuating said device; a plurality of electrical indicators having individual indicator functions; a plurality of corresponding indicator actuator circuits including a common power lead for connecting the respective indicators in parallel to a source of current, and each including a fault switch and a control connection therefrom to a respective indicator; means to control said actuating circuit, including a pulse-responsive flip-flop transistor switch operable in reverse directions in response to pulses of opposite polarity applied to a control point thereof; a plurality of trigger circuits including a pulse-transmitting conductor providing a common connection in parallel to such control point, and including respective charge-collecting condensers each connected on one side to a respective fault switch control connection for effecting discharge thereof upon closing of the respective fault switch so as to transmit through said conductor to said transistor switch a pulse of the proper polarity to render said transistor switch effective to actuate said warning device; and a reset circuit including a reset switch for connecting said transistor switch control point to a point in said system having a potential polarity opposite to that at said fault switches, whereby to transmit to said control point a pulse of opposite polarity for rendering said transistor switch effective to deenergize said warning device.

10. An indicator system as defined in claim 9, wherein the connections between said condensers and said control point on the one hand and between said condensers and said control circuits on the other hand are adapted for two-way flow of electrical energy, whereby to transmit pulses of opposite polarity to said control point in response to opening and closing of a fault switch respectively.

11. A system as defined in claim 9, including a master test switch, parallel connections between said test switch and the respective fault switch control connections, and diodes in said parallel connections for blocking current flow between said parallel connections and said fault switches.

12. In a multiple indicator system: an electrical warning device; a circuit for actuating said device; a plurality of electrical indicators having individual indicator functions; a plurality of corresponding indicator actuator circuits including a common power lead for connecting the respective indicators in parallel to a source of current, and each including a fault switch and a control connection therefrom to a respective indicator; means to control said actuating circuit, including a pulse-responsive flip-flop transistor switch comprising a first transistor for direct control of said warning device and a second transistor for controlling the bias on said first transistor for switching from conducting to non-conducting condition and vice versa in response to pulses of opposite polarity applied to a base electrode of one of said transistors; a plurality to trigger circuits including a pulse-transmitting conductor providing a common connection in parallel to said charge-collecting condensers each connected on one side to a respective fault switch control connection for effecting discharge thereof upon closing of the respective fault switch so as to transmit through said conductor to said transistor switch a pulse of the proper polarity to render said transistor switch effective to actuate said warning device; and a reset circuit including a reset switch for connecting said transistor switch control point to a point in said system having a potential polarity opposite to that at said fault switches, whereby to transmit to said control point a pulse of opposite polarity for rendering said transistor switch effective to deenergize said warning device.

13. A system as defined in claim 12, wherein said first transistor is a collector directly connected to one side of said warning device and adapted to provide current for energizing the same when said first transistor is in a conducting state.

14. A system as defined in claim 13, wherein said transmitting conductor is connected to the base electrode of said first transistor.

No references cited.